United States Patent [19]
Benzing et al.

[11] 3,841,165
[45] Oct. 15, 1974

[54] MOTION CONVERTER

[76] Inventors: James D. Layfield, 3285 Chadbourne, Cleveland, Ohio 44120
William M. Benzing, 7721 S. Coles Ave. South, Apt. A, Chicago, Ill. 60649

[22] Filed: May 16, 1973

[21] Appl. No.: 360,758

[52] U.S. Cl. ................................... 74/56
[51] Int. Cl. ........................... F16h 25/08
[58] Field of Search ............... 74/55, 56, 57

[56] References Cited
UNITED STATES PATENTS
2,401,466  6/1946  Davis et al. .......................... 74/56
2,490,444  12/1949  Lynch .................................. 74/57

FOREIGN PATENTS OR APPLICATIONS
95,234  3/1897  Germany ............................... 74/56

*Primary Examiner*—Samuel Scott
*Assistant Examiner*—Wesley S. Ratliff, Jr.

[57] ABSTRACT

A minimum friction rotary-linear motion converter has a cylindrical housing and a piston located therewithin having a continuous sinusoidal groove about its circumference defining three or more complete cycles. A shaft passes through an axial passageway within the piston and is rotationally coupled thereto by ball spline means including two or more pairs of complementary grooves longitudinally provided upon the shaft and passage, as well as ball bearings engaged therebetween. Three or more ball bearings are engaged between the sinusoidal groove and respective support members adjustably mounted at equally spaced locations within the inner wall of the cylinder. The sinusoidal groove and associated bearings cause the piston to reciprocate under a rotational force from the shaft, or cause the shaft to be rotated under a reciprocating force supplied to the piston, with minimum friction.

16 Claims, 3 Drawing Figures

PATENTED OCT 15 1974

3,841,165

MOTION CONVERTER

BACKGROUND OF THE INVENTION

The invention relates to mechanisms for converting between linear and rotary motion, and particularly, mechanisms of the type having a reciprocating piston located within a cylindrical housing and a rotatable shaft passing axially therethrough.

Such mechanisms, have ordinarily effected motion conversion by means of a guide member mounted to either the piston or cylinder, and engaging a channel or groove in the other element. A spline arrangement has been used to couple a shaft to the piston for transmitting the rotational component of the motion.

However, such mechanisms have not achieved general acceptance in practical applications involving high loads, speeds and stresses, as, for example, in engines or pumps. The advantages of direct conversion between linear and rotary motion have been inevitably accompanied by an inherently large sliding friction factor due to the guide member, as well as the shaft moving within the piston, giving rise to unacceptable inefficiency, heat, and breakdown risks.

Further serious problems in the art have been the need for separate means to maintain the reciprocating piston in alignment within the cylindrical housing, adding further friction and complexity. Frequent and complex adjustments for wear and alignment has been still another problem with prior designs.

SUMMARY OF THE INVENTION

The mechanism of the present invention solves the problems encountered in the prior art by providing a linear-rotary converter which operates with a minimum of contact and friction between the moving parts thereof and requires no separate support or alignment provisions for the reciprocating element.

The mechanism of the present invention includes wall means defining a cylinder having an axial opening at one end thereof and a plurality of recesses within said wall means located at circumferentially spaced intervals, and a piston located within the cylinder. The piston is provided with an axial passage extending therethrough and a continuous groove about the periphery thereof. At least the bottom portion of the groove has a curved cross section, and the groove defines a plurality of intersections with a median plane transversely intersecting the axis of said piston.

The mechanism also includes an elongated shaft extending through the piston passage along the axis of the cylinder, and rotary antifriction spline means extending longitudinally along the shaft and the piston for coupling the shaft and piston together rotationally. Contact between the shaft and the piston is thereby limited to rolling contact only and is localized at the rotary spline means, so that only a minimum of friction is found between the shaft and piston.

The mechanism further includes a plurality of rotary antifriction guide means mounted within the cylinder recesses and received within the groove for forcing the shaft to rotate when the piston is reciprocated, or for forcing the piston to reciprocate axially within the cylinder when the shaft is rotated. Again, contact between the piston and cylinder is limited to rolling contact, localized at the rotary guide means, which may also furnish the complete support for the piston within the cylinder. Problems of friction are thereby obviated, and the mechanism is simplified, particularly in terms of adjustment, operation and the elimination of the need to provide separate piston support or alignment means.

DETAILED DESCRIPTION

Figure 1:
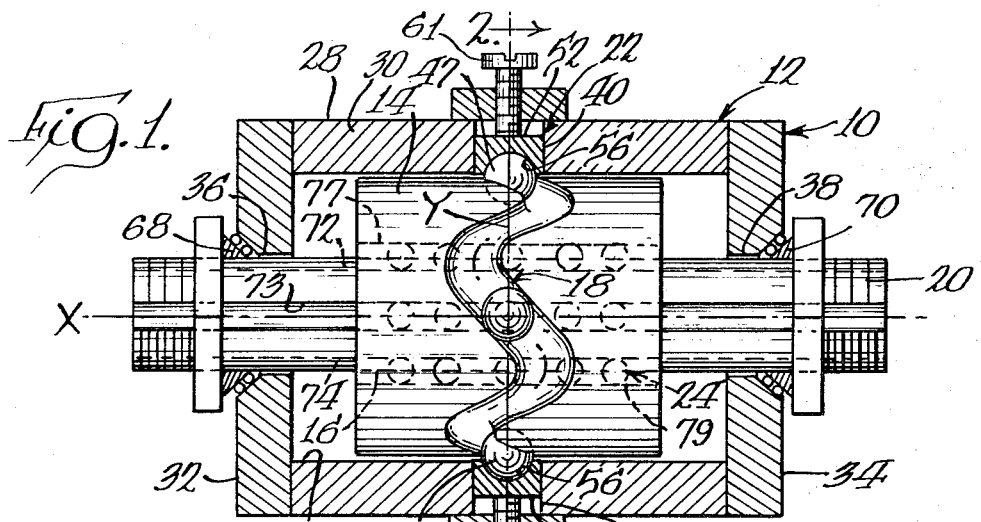
FIG. 1 is an elevational view of a preferred embodiment of the linear-rotary motion converter of the present invention, with a longitudinal half of the housing cut away.

While this invention is susceptible to embodiment in many different forms, there is shown in the drawings and will herein be described in detail a preferred embodiment of the invention, with the understanding that the present disclosure is to be considered as an exemplification of the principles of the invention and is not intended to limit the invention to the embodiment illustrated. The scope of the invention will be pointed out in the appended claims.

Referring now with particularity to the drawings, the complete mechanism for converting between rotary and linear motion is indicated at 10. It includes a housing 12, a piston 14 located therewithin, and having a cylindrical axial passageway 16 and a peripheral sinusoidal or cam groove 18, a shaft 20 passed through passageway 16 and coupled to piston 14 by anti-friction spline means 24, and a rotary guide or cam follower means 22 positioned between housing 12 and piston groove 18.

Figure 2:
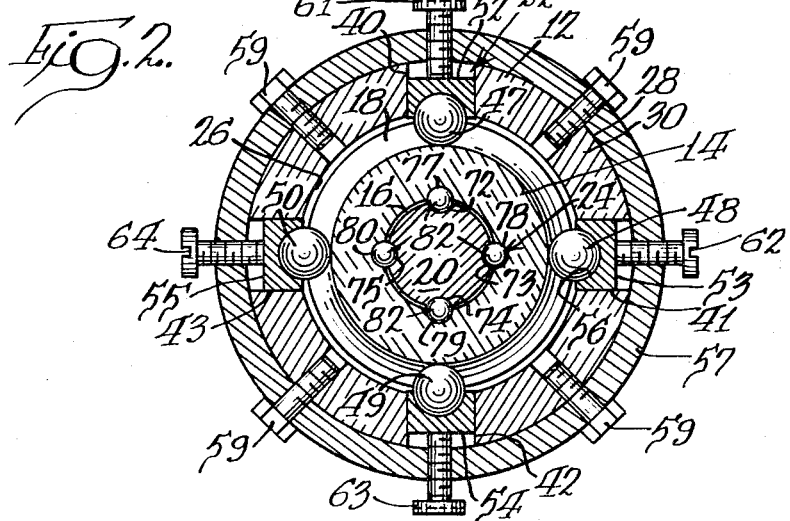
FIG. 2 is a cross-sectional view taken along line 2—2 of FIG. 1.

Housing 12 is a hollow enclosure defined in part by a tubular side wall member 30 having an inner cylindrical surface 26 defining a central axis X and an outer cylindrical surface 28 (best seen in FIG. 2). However, outer surface 28 may also have any other convenient shape as well. Housing 12 is closed at both ends by respective end plates 32 and 34, which are provided with respective axially aligned apertures 36 and 38. However, as will be noted below, either or both ends of the cylinder may also be open in some applications. Housing 12 is also provided with four similar equally circumferentially-spaced circular openings 40, 41, 42 and 43 (see especially FIG. 2) extending through side wall 30. All of the openings are located longitudinally medially of the housing, and are directed radially inwardly and orthogonally toward the X axis and are laterally aligned.

Figure 3:
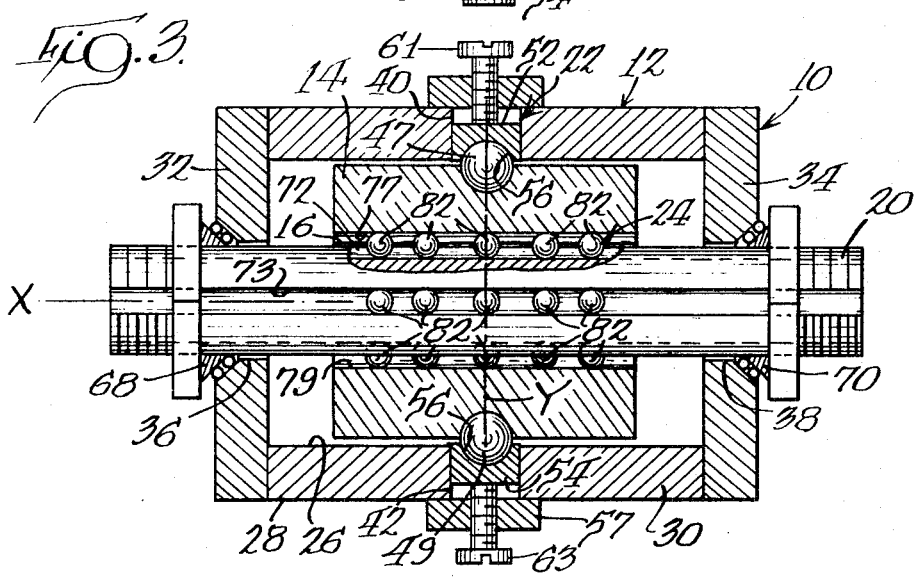
FIG. 3 is a partial cross-sectional view of the mechanism of FIG. 1, in a plane including the longitudinal axis of the device.

Within inner cylindrical surface 26 is located the coaxial piston 14 of slightly smaller diameter, and whose length is a fraction of that of tubular member 30, to permit reciprocation of the piston within the cylinder. The continuous sinusoidal groove 18 circumferentially about the piston is centered about a transverse plane perpendicular to axis X medially of the groove. This may best be appreciated from FIG. 1, where this groove medial plane is represented in FIGS. 1 and 3 by line Y. Although such plane in the illustrated embodiment is also longitudinally centered medially of the piston, it may equally well be offset toward one end or the other of the piston instead. It should be noted that although groove 18 is preferentially sinusoidal in form, it may also be of some other similar cyclic form; but in either case, groove 18 intersects its medial plane at a plurality of circumferentially equally spaced positions, and deviates to both sides of the medial plane with the same amplitude. Groove 18 is a curved concave form at least at its innermost bottom portion; in the illustrated embodiment, the cross-section of the groove, when taken in a plane parallel to and including the axis X of the piston, is a section of a circle; see FIG. 3 especially.

The rotary antifriction guide means 22 between groove 18 and housing 12 include four identical units mounted respectively within openings 40–43. Each such unit includes a spherical contact member or guide ball bearing 47, 48, 49, and 50 engaged within groove 18, and functioning as a cam groove follower, and respectively associated ball support members 52, 53, 54, and 55 positioned respectively within openings 40–43. Each support member matches its associated housing opening in configuration so as to be movable radially inwardly and outwardly therein against balls 47–50. Each of support members 52–55 is provided with a concave, preferably generally hemispherical, depression 56 on its inside face matching balls 47–50. In this manner each of the balls is permitted to rotate when engaged between groove 18 and its respective support member, while at the same time each of the balls is held stationary at the circumferentially spaced positions at each of the housing openings 40–43.

To maintain balls 47–50 within groove 18, and support members 52–55 in firm engagement with the balls, an annular retaining ring 57 is secured about outer wall 28 of the housing over the positions of openings 40–43 by means of retaining bolts 59 (FIG. 2), and includes four adjustment screws 61, 62, 63 and 64. Each such screw is threaded transversely through ring 57 and radially inwardly into a respective one of openings 40–43 to bear against support members 52–55. Thus, by turning screws 61–64, each of support members 52–55 may be individually adjusted inwardly, or allowed to relax outwardly, either to bias the associated one of the balls 47–50 more firmly into groove 18 and concave depression 56, or to relax such bias for a looser tolerance, or for alignment adjustment, In this manner, both adjustment for tolerance and adjustment for alignment, as well as later compensation for wear, is facilitated.

It should be noted that the rotary antifriction guide means 22 may in some applications be provided in nonadjustable form, in order to simplify manufacture or to provide permanently-set tolerances. In such applications openings 40–43 may simply be recesses having a concave generally hemispherical configuration similar to depression 56, but provided directly within inner surface 26 of tubular wall member 30. With such a construction, each of balls 47–50 is engaged directly between groove 18 and such recesses in the wall member 30.

Due to the sinusoidal groove 18 cooperating with rotary guide means 22, a force applied to piston 14 along the axial direction causes the piston to rotate about axis X; or conversely, rotational force applied to the piston will also cause the piston to move in the axial direction. In either case the motion conversion is accomplished with a mininum of friction, as a result of the foregoing arrangement. Although each of the guide balls 47–50 is held in position at the openings 40–43, they rotate with the movement of the piston, resulting in rolling contact only between the piston and supports 52–55, or housing 12. Such rolling contact, as well as the minimizing of the area of contact and localizing it to the guide balls, results in the conversion between rotary and linear motion being accomplished with an absolute minimum of friction.

It should be noted that four guide balls are not necessary to accomplish the motion conversion function; even a single such ball, together with groove 18, would suffice. However, the use of three or more spaced guide balls supports and centrally aligns piston 14 within cylindrical surface 26, without the use of any other separate support or alignment expedients, establishing thereby a radial bearing for piston 14. All adjustment for alignment, tolerance, wear, etc. is made in a single operation, by means of the aforementioned adjustment screws 61–64.

In establishing the number of guide balls to be used, it is important to note that the minimum number of cycles of groove 18 needed to accommodate the balls will vary. Thus, if only two guide balls are used, the groove must define two complete cycles of a sinusoidal (or similar) curve; for the illustrated embodiment, four cycles are needed to accommodate four balls. But the minimum number of guide balls which will support the piston, functioning as a radial bearing, is three; consequently, at least three cycles are required if such support is desired.

In order to transmit the rotary component of the motion of the reciprocating piston outside of the converter mechanism, or to apply a rotary force to the piston to cause it to reciprocate, the shaft 20, coupled to piston 14 by the rotary spline means 24, extends outwardly through both end plates 32 and 34. In order to insure that shaft 20 does not move axially and is properly supported, a pair of conical thrust bearings 68 and 70 are provided respectively between the shaft and each of end plates 32 and 34. However, it should be noted that such bearings are not necessary, and neither need the shaft extend from both ends of housing 12. Indeed, the shaft may be recessed within one or both ends, and an outside shaft extended inwardly into the housing and coupled to shaft 20.

The rotary spline means 24 includes a set of four longitudinally-extending and equally circumferentially-spaced channels 72, 73, 74 and 75 provided along the outer surface of shaft 20, and a matching opposing set of channels 77, 78, 79 and 80 provided about the cylindrical inner surface of piston axial passage 16 (shown partially in cross-section in FIG. 3), and a plurality of spline ball bearings 82 captured between each respective one pair of opposed spline channels. Both sets of spline channels are concave depressions having a curved cross-section preferably of generally semicircular configuration, with a radius similar to that of spline ball bearings 82 when viewed in the aforementioned medial piston plane. The respective plurality of spline ball bearings within each of the opposed matched spline channels may be retained therewithin by annular plates (not shown) secured to each end of the piston and substantially closing the piston spline channels 72–75.

In this manner when a force is applied to piston 14 along the axial direction, the rotation of the piston which results because of the above described groove-guide means cooperation is transmitted to shaft 20, while the axial component is not. Conversely, the piston is reciprocated by transmitting a rotational force to the piston by means of shaft 20. In either mode, the piston moves axially along shaft 20 in isolation therefrom and with only a rolling contact therebetween, minimizing the area of contact and localizing it at spline ball bearings 82. Accordingly, friction due to the axial component of piston motion and consequent wear and heat is kept at a minimum.

It should be noted that although four opposed pairs of spline channels each enclosing a plurality of ball bearings are utilized in the preferred embodiment, the number of such opposed channels is not critical and may range down to two pairs of opposed channels, one pair being directly opposite the other. Similarly, the number of spline ball bearings used within each spline channel pair is not critical, and depends on considerations of tolerances, shaft alignment, load, and the degree of the piston support by the rotary spline means.

The mechanism as a whole is a highly advantageous one with features and advantages particularly useful for heavy-duty high-speed and stress applications for which prior designs have not been well suited. The mechanism not only has high strength and low friction, but also provides for adjustments which are both quickly made, and rarely needed. The piston may be fully isolated from the cylinder by rotary means, used likewise between piston and shaft, with the wear and stress being localized as well as minimized, in such rotary means. Finally, the mechanism achieves a superior efficiency of conversion between rotary and linear motion with a construction which is simplified compared to any prior design.

What is claimed is:

1. A mechanism for converting between rotary and linear motion comprising: wall means defining a cylinder and a plurality of recesses within said wall means and located at circumferentially spaced intervals; a piston located within said cylinder and having an axial passage extending therethrough, and a continuous groove about the periphery thereof, said groove defining a plurality of intersections with a plane transversely intersecting the axis of said piston, at least the bottom portion of said groove having a curved cross-section; an elongated shaft extending into said axial passage along the axis of said cylinder; rotary antifriction spline means extending longitudinally along said shaft and said piston for coupling said shaft and piston together rotationally and providing rolling contact between said shaft and said piston; and a plurality of rotary antifriction guide means mounted within said cylinder recesses and received within said groove for forcing said piston to reciprocate axially within said cylinder when said shaft is rotated, or for forcing said shaft to rotate when said cylinder is reciprocated, while minimizing friction.

2. A mechanism as in claim 1, in which the configuration of the portion of said antifriction guide means in contact with said bottom portion of said groove is that of at least a portion of a sphere.

3. A mechanism as in claim 1, in which said rotary guide means includes at least one ball bearing engaged between one of said cylinder recesses and said groove.

4. A mechanism for converting between rotary and linear motion comprising: wall means defining a cylinder and a plurality of recesses within said wall means and located at circumferentially spaced intervals therein; a piston located within said cylinder and having an axial passage extending therethrough, and a continuous groove about the periphery thereof, said groove defining a plurality of intersections with a plane transversely intersecting the axis of said piston, and at least the bottom portion of said groove having a curved cross-section; an elongated shaft extending into said axial passage along the axis of said cylinder; rotary antifriction spline means extending longitudinally along said shaft and said piston for coupling said shaft and piston together rotationally and providing a rolling contact between said shaft and said piston; and a plurality of rotary antifriction guide means mounted within said cylinder recesses and received within said groove for causing said piston to reciprocate axially within said cylinder when said shaft is rotated or for causing said shaft to rotate when said cylinder is reciprocated while minimizing friction; said rotary guide means including a plurality of support members mounted within each of said cylindrical recesses so as to be adjustable radially inwardly and outwardly, said rotary guide means further including a plurality of contact members associated with each of said support members, and said support members urging said contact members radially inwardly into engagement within said groove, with at least the portion of said contact member in contact with said bottom portion of said groove being rounded in configuration.

5. A mechanism as in claim 4, in which said contact member is a sphere.

6. A mechanism as in claim 5, in which said support member is provided with a concave depression and said spherical contact member is rotatably engaged between said depression and said groove.

7. A mechanism as in claim 4, which further includes an annular ring positioned about said wall means over the locations of said recesses, and screw means passing transversely through said ring and wall means and bearing upon said support means to adjustably urge said support members inwardly and bias said spherical contact member into engagement with said groove.

8. A mechanism as in claim 1, in which said groove cross section taken in a plane parallel to and including the axis of the piston is a section of a circle.

9. A mechanism as in claim 1, in which said continuous groove deviates from said median plane on both sides thereof with the same amplitude and includes at least three complete cycles, with said intersections of said groove with said plane being circumferentially evenly spaced.

10. A mechanism as in claim 9, in which said continuous groove is sinusoidal.

11. A mechanism for converting between rotary and linear motion comprising: wall means defining a cylinder and a plurality of recesses within said wall means and located at circumferentially spaced intervals therein; a piston located within said cylinder and having an axial passage extending therethrough, and a continuous groove about the periphery thereof, said groove defining a plurality of intersections with a plane transversely intersecting the axis of said piston, and at least the bottom portion of said groove having a curved cross-section; an elongated shaft extending into said axial passage along the axis of said cylinder; rotary antifriction spline means extending longitudinally along said shaft and said piston for coupling said shaft and piston together rotationally and providing a rolling contact between said shaft and said piston; and a plurality of rotary antifriction guide means mounted within said cylinder recesses and received within said groove for causing said piston to reciprocate axially within said cylinder when said shaft is rotated or for causing said shaft to rotate when said cylinder is reciprocated while minimizing friction; said piston axial passageway including a cylindrical inner surface and said shaft including a cylindrical outer surface, and spline means being comprised of a first plurality of circumferentially spaced longitudinal channels provided upon one of said surfaces, a plurality of opposed concave spline depressions in the other of said surfaces, and said spline means further including at least one spline ball bearing captured between each first channel and opposed spline depression providing thereby said rotational coupling between said shaft and said piston.

12. A mechanism as in claim 11, in which said concave spline depressions are constituted by a second plurality of longitudinal channels matching said first channels and positioned in opposed relationship therewith, each of said matching opposed longitudinal channels further including a plurality of said ball bearings captured therebetween.

13. A mechanism as in claim 12, in which the cross sections of each of said opposed longitudinal channels taken in a plane perpendicular thereto is generally semicircular in form.

14. A mechanism for enabling conversion between rotary and linear movement with a minimum of friction, comprising: wall means defining a cylinder and a plurality of recesses within said wall means located at circumferentially spaced intervals; a piston located within said cylinder having a continuous groove about the periphery thereof, said groove defining a plurality of intersections with a plane transversely intersecting the axis of said piston, at least the bottom portion of the groove having a curved cross section; and radial bearings supporting said piston within said cylinder, including three or more rotary bearing means each engaged within both said groove and within respective ones of said recesses, said rotary bearing means minimizing friction between said piston and said cylinder and forcing said piston to reciprocate upon application of a rotational force thereon, or to rotate upon application of a force acting linearly in the axial direction.

15. A mechanism for converting between rotary and linear motion comprising: wall means defining a cylinder and a plurality of recesses within said wall means and located at circumferentially spaced intervals; a piston located within said cylinder and having an axial passage extending therethrough, and a continuous groove about the periphery thereof at least the bottom portion of said groove having a curved cross section and said groove defining a plurality of intersections with a plane transversely intersecting the axis of said piston; an elongated shaft extending into said axial passage; spline means extending longitudinally along said shaft and said piston and providing rolling contact between said shaft and said piston for coupling said shaft and piston together rotationally; and a plurality of rotary antifriction guide means mounted within said cylinder recesses and received within said groove for forcing said piston to reciprocate axially within said cylinder when said shaft is rotated, or for forcing said shaft to rotate when said cylinder is reciprocated, while minimizing friction.

16. A mechanism for converting between rotary and linear motion comprising: wall means defining a cylinder and a plurality of recesses within said wall means and located at circumferentially spaced intervals; a piston located within said cylinder and having an axial passage extending therethrough, and a continuous groove about the periphery thereof defining a plurality of intersections with a plane transversely intersecting the axis of said piston, at least the bottom portion of said groove having a curved cross section; an elongated shaft extending into said axial passage; at least one guide member mounted within said cylinder recesses and engaged within said groove; rotary antifriction spline means extending longitudinally along said shaft and said piston for coupling said shaft and piston together rotationally so that when said shaft is rotated, said piston under the influence of said guide member reciprocates within said cylinder, or when said piston is reciprocated, said shaft rotates, and friction between said shaft and piston is minimized.

* * * * *